United States Patent
Bozdogan et al.

(10) Patent No.: US 7,922,453 B2
(45) Date of Patent: Apr. 12, 2011

(54) PROCESS FOR PREPARING TURBINE BLADES OR VANES FOR A SUBSEQUENT TREATMENT, AND ASSOCIATED TURBINE BLADE OR VANE

(75) Inventors: Halis Bozdogan, Berlin (DE); Francis-Jurjen Ladru, Berlin (DE); Jean Müller, Berlin (DE); Helge Reymann, Briarcliff Manor, NY (US); Manuel Schusch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1128 days.

(21) Appl. No.: 11/651,706

(22) Filed: Jan. 10, 2007

(65) Prior Publication Data
US 2010/0254818 A1 Oct. 7, 2010

(30) Foreign Application Priority Data
Jan. 10, 2006 (EP) .................................. 06000401

(51) Int. Cl.
*F01D 5/14* (2006.01)

(52) U.S. Cl. ................. 416/193 A; 416/241 R
(58) Field of Classification Search ............... 416/193 A
See application file for complete search history.

(56) References Cited

U.S. PATENT DOCUMENTS

| | | | | |
|---|---|---|---|---|
| 4,189,282 A | * | 2/1980 | Benoist et al. ............ | 416/193 A |
| 4,524,980 A | * | 6/1985 | Lillibridge et al. ....... | 416/193 A |
| 4,530,861 A | | 7/1985 | Sippel et al. | |
| 6,171,058 B1 | * | 1/2001 | Stec .......................... | 416/193 A |
| 6,893,215 B2 | * | 5/2005 | Kuwabara et al. ........ | 416/193 A |
| 2005/0227589 A1 | | 10/2005 | Oussaada et al. | |
| 2007/0258816 A1 | * | 11/2007 | Bouchard et al. ......... | 416/193 A |

FOREIGN PATENT DOCUMENTS

| | | |
|---|---|---|
| DE | 102 33 492 A1 | 11/2003 |
| EP | 0 412 297 A2 | 2/1991 |
| EP | 0 486 489 B1 | 5/1992 |
| EP | 0 786 017 B1 | 7/1997 |
| EP | 1 204 776 B1 | 5/2002 |
| EP | 1 306 454 A1 | 5/2003 |
| EP | 1 319 729 A1 | 6/2003 |
| WO | WO 99/67435 A1 | 12/1999 |
| WO | WO 00/44949 A1 | 8/2000 |

OTHER PUBLICATIONS

"Ullmann's Encyclopedia of Industrial Chemistry", Sixth Completely Revised Edition, 2003, vol. 21, pp. 573-575, Wiley-VCH.

* cited by examiner

*Primary Examiner* — Richard Edgar

(57) ABSTRACT

Process for preparing turbine blades or vanes for a subsequent treatment, for example the application of a coating and/or a material-removing operation, wherein the turbine blade or vane has an airfoil, which is delimited at at least one end by an endplate with peripheral surfaces, wherein at least one of the peripheral surfaces is at least partially covered prior to the treatment of the turbine blade or vane. In the process a covering strip is fitted onto at least one peripheral surface to form a plug connection.

18 Claims, 2 Drawing Sheets

PROCESS FOR PREPARING TURBINE BLADES OR VANES FOR A SUBSEQUENT TREATMENT, AND ASSOCIATED TURBINE BLADE OR VANE

CROSS REFERENCE TO RELATED APPLICATIONS

This application claims priority of European application No. 06000401.7 EP filed Jan. 10, 2006, which is incorporated by reference herein in its entirety.

FIELD OF INVENTION

The invention relates to a process for preparing turbine blades or vanes for a subsequent treatment, for example the application of a coating and/or a material-removing operation, wherein the turbine blade or vane has an airfoil, which is delimited at at least one end by an endplate with peripheral surfaces, wherein at least one of the peripheral surfaces is at least partially covered prior to the treatment of the turbine blade or vane. The invention also relates to a turbine blade or vane having an airfoil, which is delimited at at least one end by an endplate that has a hot-gas side facing the airfoil and adjoining peripheral surfaces.

BACKGROUND OF INVENTION

To improve their temperature and/or abrasion resistance, turbine blades or vanes, such as guide vanes and rotor blades which are intended for gas turbines, are coated with suitable metals, metal alloys or ceramics. The coating is done by means of a spray coating apparatus in which the turbine blade or vane is spray-coated. Examples of spray-coating processes include atmospheric plasma spraying (APS) and high-velocity oxyfuel spraying (HVOF) (cf. Ullmanns Encyclopedia of Industrial Chemistry, 2003, Vol 21, pages 573 and 575).

In the context of turbine blades or vanes, a distinction is drawn between guide vanes and rotor blades. Both have an airfoil which is exposed to the hot gas and at one end merges into a root body which serves to secure the turbine blade or vane either to a rotor (in the case of a rotor blade) or to a holder (in the case of a guide vane). At the other end of the airfoil, a guide vane additionally has a head body which, like the root body, is intended for securing to a holder. At the transition to the airfoil, root and head bodies form endplates in the form of root plates or head plates, which have a hot-gas side facing the airfoil and adjoining peripheral surfaces.

The coating described above is carried out only on those surfaces which are exposed to the hot gas, i.e. the airfoil and the hot-gas sides of the root plate and if present also head plate. The peripheral surfaces of these endplates and also the remaining parts of the root body and if present head body, according to the specification, must remain free of coating, since they have already been machined to their final dimensions. Therefore, in the spray coating apparatus the root body and if present also the head body are covered as far as possible, apart from the respective hot-gas side. However, it is virtually inevitable that coating material will also reach those parts of the peripheral surfaces of the endplates which are adjacent to the hot-gas side, i.e. that some overspray, as it is known, will occur. This requires the coating to be removed by grinding (overspray grinding) in a subsequent process step. This presents the risk of uncoated parts of the peripheral surfaces also being ground, with the result that their final dimensions change.

SUMMARY OF INVENTION

An object of the invention is to provide a process which can be used to protect the peripheral surfaces of the endplates of turbine plates or vanes both during the coating operation and during the subsequent overspray grinding. A further object is to design a turbine blade or vane which is suitable for this purpose.

According to the invention, the first part of the object is achieved by a process in which a covering strip is fitted to at least one peripheral surface to form a plug connection. Therefore, it is a basic concept of the invention for the peripheral surfaces of the endplate(s) to be protected with the aid of covering strips, which are each held on the turbine blade or vane by means of a plug connection. The plug connection allows simple yet secure fixing of the covering strip in the region of the peripheral surfaces. The covering strip protects the peripheral surfaces from being sprayed with coating material during the coating operation. Should overspray, i.e. coating of part of the peripheral surfaces, occur, this overspray can be removed following the coating operation by grinding with the covering strip still attached, in which case the covering strip then protects the uncoated part of the peripheral surfaces. This significantly reduces the risk of the size dropping below the required final dimensions.

In a refinement of the invention, the covering strip used, or the required number of covering strips used, in the plug-on state covers that region of the respective peripheral surface which extends on the side of the plug connection remote from the airfoil. In this case, overspray can only occur in the part which is left uncovered by the covering strip.

According to the invention, it is also proposed that peripheral surface(s) and covering strip(s) are matched to one another in such a manner that their plug connection produces a tongue-and-groove connection. This can be done in such a way that a groove is formed into at least one of the peripheral surfaces, and the covering strip used has a plug-in limb which is plugged into the groove. The covering strip can in this case be formed as angle profiled section with a protective limb adjoining the plug-in limb, in which case it is expedient for the plug-in limb and protective limb to be at right angles to one another.

It has proven expedient to use a covering strip with a length that is greater than the depth of the airfoil, so that the covering strip has a projecting portion.

According to the invention, a step is also formed into the peripheral surfaces at least in the region of the plug connection. It may project outward on the side of the plug connection remote from the airfoil, but also on the side facing the airfoil.

According to the invention, the second part of the object is achieved by a turbine blade or vane in which at least one of the peripheral surfaces in each case has at least one plug-connection recess and/or a plug-connection projection. If a plug-connection recess is provided, it may, for example, be formed as a groove.

As has already been mentioned above, the turbine blade or vane may also be formed in such a way that the peripheral surfaces, in the region of the plug-connection recess or the plug-connection projection, have a step which projects either on the side of the plug-connection recess or plug-connection projection remote from the airfoil or on the side facing the airfoil.

Furthermore, according to the basic concept of the process according to the invention, it is also provided that a covering strip is fitted onto at least one peripheral surface, so as to form a plug connection to the plug-connection recess or the plug-connection projection, this covering strip advantageously covering that region of the peripheral surface which extends on the side of the plug connection remote from the airfoil. The plug connection should preferably be formed as a tongue-and-groove connection. This can be realized in such a way that the covering strip has a plug-in limb which fits into the at least one plug-connection recess.

The covering strip is advantageously formed as an angle profiled section having a protective limb which adjoins the plug-in limb at an angle. The limbs may form a right angle with one another. The length of the covering strip should be greater than the depth of the airfoil.

The covering strip may consist of a suitable material which is able to withstand overspray grinding.

It should expediently consist of a metal, such as steel or the like.

If the turbine blade or vane is in the form of a guide vane, the airfoil of which is delimited by endplates at both ends, a covering strip should be fitted onto in each case at least one of the peripheral surfaces of both endplates.

BRIEF DESCRIPTION OF THE DRAWINGS

The invention is explained in more detail in the drawing and with reference to exemplary embodiments. In the drawing.

DETAILED DESCRIPTION OF INVENTION

Figure 1:
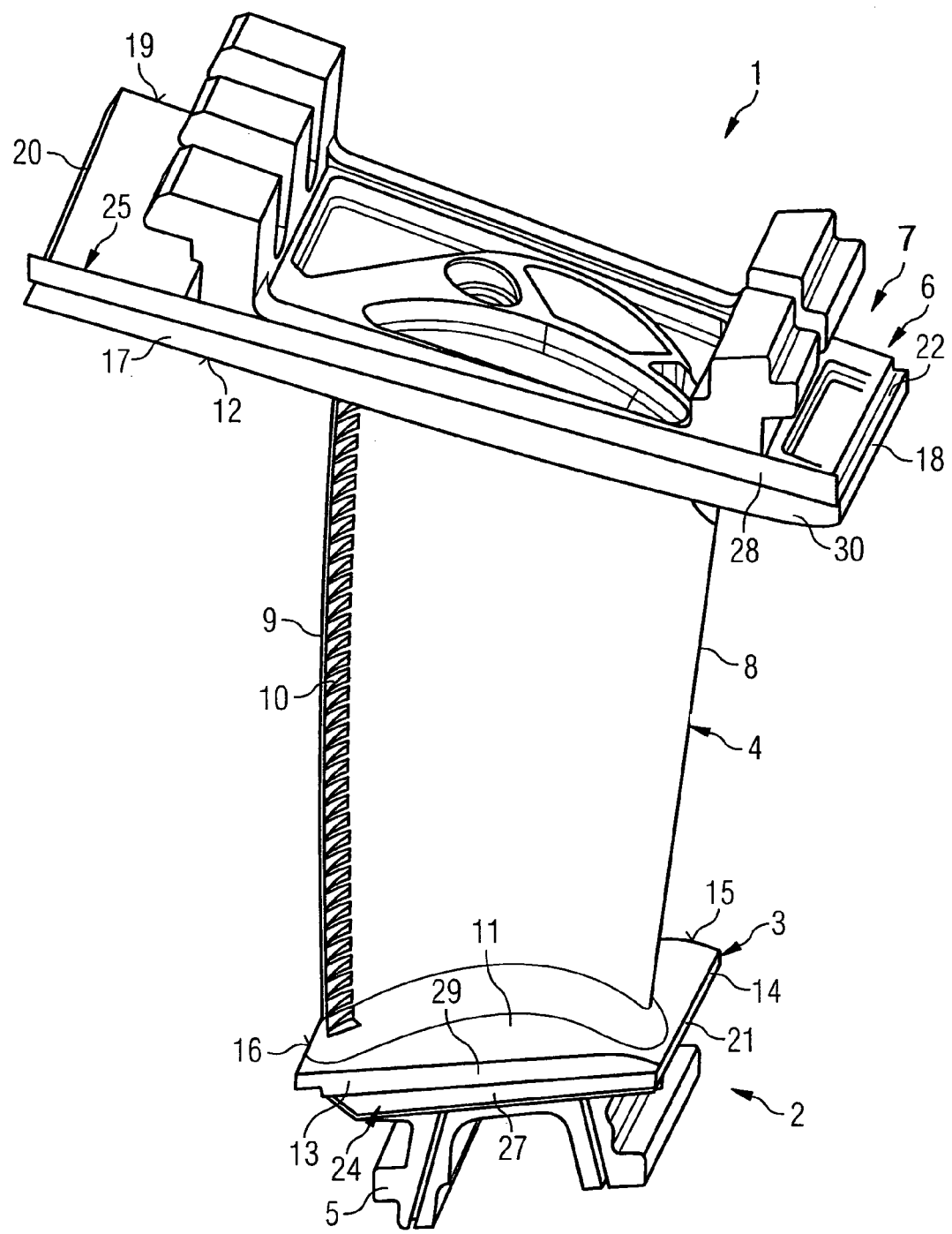
FIG. 1 shows a perspective view of a guide vane for a gas turbine.

The guide vane 1 illustrated in FIG. 1 is intended for a turbomachine onward. This may be a gas turbine for an aircraft or a power plant for power generation, a steam turbine or a compressor.

The guide vane 1 has, in succession along its extent a securing region 2, an adjoining root plate 3, an airfoil 4 and a head part 5 which adjoins the vane tip and has a head plate 6 adjacent to the airfoil 4. The head part 5 is not present if the turbine blade or vane is configured as a rotor blade.

In the securing region 2 there is a blade root 7, which is used to secure the guide vane 1 to a disk (not shown). The vane root 7 is in this case designed as dovetail root. Other configurations, such as a fir-tree or hammerhead root, are also possible. The airfoil 4 has a leading edge 8 and a trailing edge 9 for a medium which passes through the turbomachine, flowing past the airfoil 4.

Conventional vanes consist, for example, of solid metallic materials, in particular superalloys. Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy. The turbine blade may in this case be produced by a casting process, also by means of directional solidification, by a forging process, by a milling process or combinations thereof.

The turbine blades are provided with a coating protecting against corrosion or oxidation, e.g. MCrAlX (M is at least one element selected from the group consisting of iron (Fe), cobalt (Co), nickel (Ni), X is an active element and represents yttrium (Y) and/or silicon and/or at least one rare earth element, or hafnium (Hf). Alloys of this type are known from EP 0 486 489 B1, EP 0 786,017 B1, EP 0 412 297 B1 or EP 1 306 454 A1, which are intended to form part of the present disclosure with regard to the chemical composition of the alloy.

It is also possible for a thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX coating. Columnar grains are produced in the thermal barrier coating by means of suitable coating processes, such as for example electron beam physical vapor deposition (EB-PVD), or grains which are porous, have microcracks and have macrocracks are produced in the thermal barrier coating by atmospheric plasma spraying (APS).

Refurbishment means that after they have been used, protected layers may have to be removed from components (e.g. by sand-blasting). Then, the corrosion and/or oxidation layers and products are removed. If appropriate, cracks in the component are also repaired. This is followed by recoating and reuse of the turbine vane.

The guide vane 1 is hollow in form. On the pressure side, visible in FIG. 1, of the airfoil 4 it has, in the region of the trailing edge 9, a row of film-cooling holes—denoted for example by 10—via which cooling air introduced into the airfoil 4 can flow out, thereby cooling the trailing edge 9.

The root plate 3 and the head plate 6 each have a hot-gas side 11, 12 facing the airfoil 4. The hot-gas sides 11, 12 are in each case adjoined by four peripheral surfaces 13, 14, 15, 16 and 17, 18, 19, 20, respectively, which are each provided with a step 21, 22, as can also be seen from FIG. 2. The steps 21, 22 project outward with respect to that region of the peripheral surfaces 13 to 20 which is in each case adjacent to the airfoil 4. The steps 21, 22 merge into a peripheral groove 23. Grooves 23 are formed both into the peripheral surfaces 13 to 16 of the root plate 3 and into the peripheral surfaces 17 to 20 of the head plate 6.

Covering strips 24, 25 are plugged into the grooves 23. The covering strips 24, 25 extend over the entire width of the peripheral surface 13 or 17. They are formed as angle profiled sections, each having a plug-in limb 26 and a protective limb 27, 28 in each case running at right angles to the plug-in limb. The plug-in limbs 26 are seated in the grooves 23 and in this way form a plug connection to the root plate 3 or the head plate 6. The covering strips 24, 25 are fitted into the grooves 23 in such a way that their protective limbs 27, 28 are directed away from the respective hot-gas side 11 or 12 and cover those regions of the peripheral surfaces 13 or 17 which—as seen from the airfoil 4—lie behind the grooves 23.

The guide vane 1 having the covering strips 24, 25 is provided with the coating described above in a spray coating apparatus, specifically in such a manner that the airfoil 4 and the hot-gas sides 11, 12 of the root plate 3 and head plate 6 are coated. The coating operation also produces an overspray coating 29, 30 on those regions of the peripheral surfaces 13, 17 which are not covered by the covering strips 24, 25. The overspray coatings 29, 30 are manually ground away after the coating operation, with the covering strips 24, 25 remaining on the root plate 3 and head plate 6, thereby providing protection against slipping on the part of the grinding unit. In this way, the grinding operation remains restricted to the region which has the overspray coating 29, 30. The covering strips 24, 25 are only removed again after the grinding operation, and can then be reused.

Figure 4:
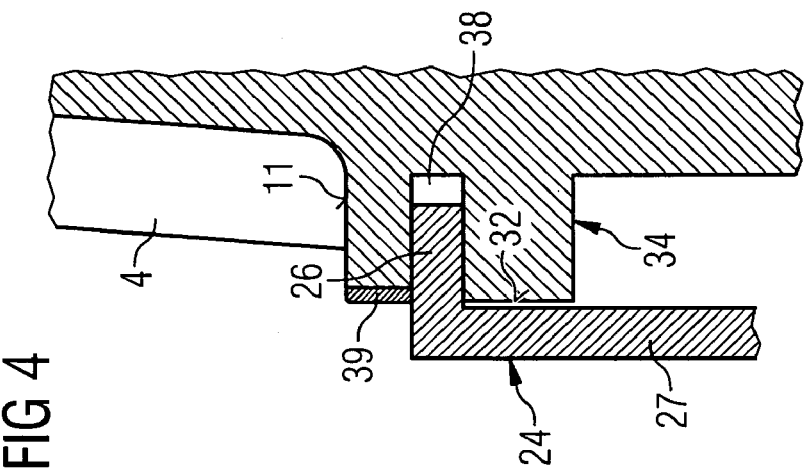
FIG. 4 shows a partial cross section through a third variant of a root plate.
Figure 3:
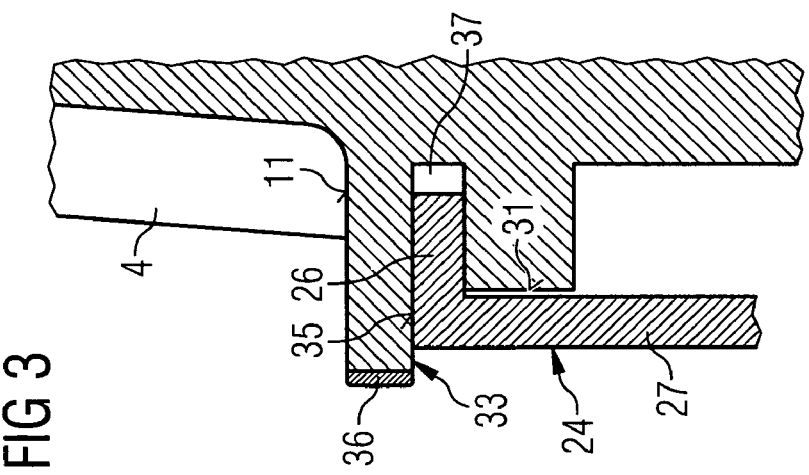
FIG. 3 shows a partial cross section through a second variant of a root plate.
Figure 2:
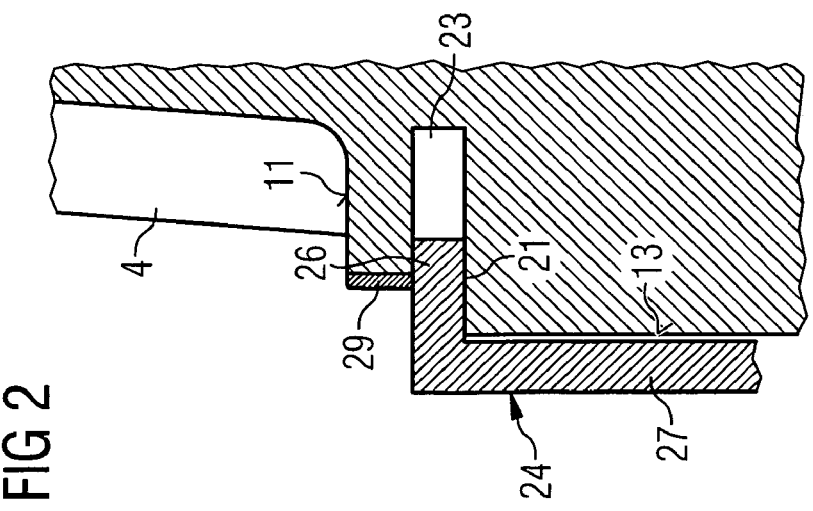
FIG. 2 shows a partial cross section through the root plate of the guide vane shown in FIG. 1.

FIGS. 3 and 4 show forms of peripheral surfaces 31, 32 of root plates 33, 34 which differ from the embodiment shown in FIGS. 1 and 2. In an embodiment shown in FIG. 3, a step 35 is formed by that region of the peripheral surface 31 which is adjacent to the airfoil 4 projecting outward, an overspray coating 36 having formed on this part. The step 35 merges into a groove 37, into which the covering strip 24 is plug-fitted by means of a plug-in limb 26.

There is no step present in the exemplary embodiment shown in FIG. 4. A groove 38 has been formed into the peripheral surface 32, and the covering strip 24 has been plug-fitted into this groove 38 in such a manner that its protective limb 27 extends in the direction away from the airfoil 4. That region of the peripheral surface 32 which is adjacent to the airfoil 4 has been provided with an overspray coating 39.

The invention claimed is:

1. A method of treating a turbine blade, comprising:
providing the turbine blade having an endplate with a peripheral surface;
placing a covering strip on the peripheral surface using a plug connection to at least partially cover the peripheral surface;
providing the plug connection by a groove formed into the peripheral surfaces;
plugging a plug-in limb of the covering strip into the groove;
coating the turbine blade with a material comprising metal or metal alloy or ceramic;
removing coating material from regions of the peripheral surface which are not covered by the covering strip; and
removing the covering strip from the turbine blade.

2. The method as claimed in claim 1, wherein the covering strip covers a region of the peripheral surface which extends on a side of the plug connection remote from the airfoil.

3. The method as claimed in claim 1, wherein the peripheral surface and the covering strip are plugged together as a tongue-and-groove connection.

4. The method as claimed in claim 1, wherein the covering strip has an angle profiled section with a protective limb adjoining the plug-in limb.

5. The method as claimed in claim 4, wherein the plug-in limb and the protective limb are perpendicular to one another.

6. The method as claimed in claim 1, wherein the covering strip has a length that is greater than the depth of the airfoil.

7. The method as claimed in claim 1, wherein the peripheral surface has a step in a region of the plug connection.

8. The method as claimed in claim 7, wherein the step projects outward on the side of the plug connection remote from the airfoil.

9. The method as claimed in claim 7, wherein the step projects outward on the side of the plug connection facing the airfoil.

10. A turbine blade, comprising:
an airfoil having an endplate with a hot-gas side facing the airfoil and adjoining peripheral surfaces; and
a plug-connection recess arranged on at least one of the peripheral surfaces,
wherein the at least one peripheral surface has a step in a region of the plug-connection recess, and
wherein the step projects outward on a side of the plug-connection recess, the side being remote from the airfoil or facing the airfoil.

11. A turbine blade as claimed in claim 10, wherein a plug-connection projection is arranged on a further surface of the peripheral surfaces.

12. The turbine blade as claimed in claim 10, wherein the plug-connection recess is formed as a groove.

13. The turbine blade as claimed in claim 10, wherein a covering strip covers the region of a peripheral surface which extends on a side of a plug connection between the covering strip and the turbine blade remote from the blade.

14. The turbine blade as claimed in claim 13, the covering strip is formed as an angle profiled section having a protective limb which adjoins a plug-in limb at an right angle.

15. The turbine blade as claimed in claims 13, wherein a length of the covering strip is greater than the depth of the airfoil.

16. The turbine blade as claimed in claim 13, wherein the covering strip consists of metal.

17. The turbine blade as claimed in claim 13, wherein the airfoil is delimited at both ends by endplates, and a covering strip is fitted onto a peripheral surface of two endplates.

18. A turbine blade, comprising:
an airfoil having an endplate with a hot-gas side facing the airfoil and adjoining peripheral surfaces; and
a plug-connection projection arranged on at least one of the peripheral surface,
wherein the at least one peripheral surface has a step in a region of the plug-connection projection, and
wherein the step projects outward on a side of the plug-connection projection, the side being remote from the airfoil or facing the airfoil.

* * * * *